United States Patent [19]

Hartrick et al.

[11] Patent Number: 5,428,529
[45] Date of Patent: Jun. 27, 1995

[54] STRUCTURED DOCUMENT TAGS INVOKING SPECIALIZED FUNCTIONS

[75] Inventors: Thomas V. Hartrick; Patricia E. Higgins, both of Gaithersburg; Nicholas J. Sabia, Silver Spring, all of Md.

[73] Assignee: International Business Machines Corporation, Armonk, N.Y.

[21] Appl. No.: 546,334

[22] Filed: Jun. 29, 1990

[51] Int. Cl.[6] ............................................. G06F 15/20
[52] U.S. Cl. .................................. 364/419.1; 395/145
[58] Field of Search ............... 395/144, 145, 146, 148; 380/4, 5, 3; 340/825.25; 364/401

[56] References Cited

U.S. PATENT DOCUMENTS

| | | | |
|---|---|---|---|
| 4,688,169 | 8/1987 | Joshi | 364/DIG. 2 |
| 4,881,179 | 11/1989 | Vincent | 364/518 |
| 5,126,728 | 6/1992 | Hall | 340/825.3 |
| 5,146,552 | 9/1992 | Cassorla et al. | 395/145 |

FOREIGN PATENT DOCUMENTS 8605294 9/1986 United Kingdom .

Primary Examiner—Gail O. Hayes
Assistant Examiner—A. Bodendorf
Attorney, Agent, or Firm—Edward H. Duffield; John E. Hoel

[57] ABSTRACT

A system and method are disclosed for managing the display or the printing of a copyright notice or security label for a soft copy document, so as to provide appropriate security for the document as desired by its author. A special copyright notice can be displayed on the first page or predetermined pages of the document as it is displayed on a display screen. If a printer is connected to the system and commanded to print the document, a cover page will be printed which includes the copyright notice, before the rest of the document is printed. If a "Do Not Copy" label is included in the soft copy of the structured document, any printer command, write to disk command, or telecommunication command will be aborted, thereby giving effect to the author's desired restriction not to copy the document.

4 Claims, 17 Drawing Sheets

FIG. 2

[CPR] (C) COPYRIGHT JEFFERSON & CO. 1776 [/CPR] ← COPYRIGHT 40
[P]WE HOLD THESE TRUTHS TO BE SELF-EVIDENT, THAT
ALL MEN ARE CREATED EQUAL, THAT THEY ARE ENDOWED — PARAGRAPH 28
BY THEIR CREATOR WITH CERTAIN UNALIENABLE RIGHTS,
THAT AMONG THESE ARE[/P]
[LIST]
    [LI]LIFE,[/LI] ← 32
    [LI]LIBERTY AND[/LI] ← 34 — LIST 30
    [LI]THE PURSUIT OF HAPPINESS.[/LI] ← 36
[/LIST]
[P]THAT TO SECURE THESE RIGHTS, GOVERNMENTS ARE
INSTITUTED AMONG MEN, DERIVING THEIR JUST POWERS — PARAGRAPH 38
FROM THE CONSENT OF THE GOVERNED.[/P]
[SEC2]DO NOT COPY[/SEC2]

| TAG | STRINGS LOADED FROM TAGGED TEXT | ON | DISPLAY 1ST PAGE | DISPLAY ALL PAGES | LOCAL ELMNT COORD. | PRINTER COVER PAGE | PRINTER ALL PAGES | PRINTER ABORT | DISK DRIVE ABORT | COMMU-NICATE ABORT | SOUND PLAY |
|---|---|---|---|---|---|---|---|---|---|---|---|
| CPR | COPYRIGHT | | X | | | X | | | | | |
| SEC1 | SECURITY LABEL | | | X | | X | X | | | | |
| SEC2 | DO NOT COPY | | | X | | | | X | X | X | |
| SEC3 | DO NOT SEND | | | | | | | | | X | |
| REST | RESTRICTION | | X | | | X | | | | | |
| PSWD | PASSWORD | | | | | | | | | | |
| LOCA | LOCAL PAGE: A (DISPLAY) | | | | | | | | | | |
| LOCB | B (VOICE) | | | | | | | | | | X |
| LOCC | C (SOUND) | | | | | | | | | | X |

FIG. 5

| TAG | STRINGS LOADED FROM TAGGED TEXT | FLAG ON | DISPLAY 1ST PAGE | DISPLAY ALL PAGES | LOCAL ELMNT COORD. | PRINTER COVER PAGE | PRINTER ALL PAGES | PRINTER ABORT | DISK DRIVE ABORT | COMMUNICATE ABORT | SOUND PLAY |
|---|---|---|---|---|---|---|---|---|---|---|---|
| CPR | (C) ABC CO 1990 | X | X | | | X | | | | | |
| SEC1 | SECURITY LABEL | | | X | | X | X | | | | |
| SEC2 | DO NOT COPY | X | | X | | | | X | X | X | |
| SEC3 | DO NOT SEND | | | | | | | | | X | |
| REST | RESTRICTION | | X | | | X | | | | | |
| PSWD | PASSWORD | | | | | | | | | | |
| LOCA | LOCAL ELEMENT: REVERSE VIDEO | X | | | 1211 | | | | | | |
| LOCB | B (VOICE) | | | | | | | | | | X |
| LOCC | 10101110 | X | | | 1101 | | | | | | X |

FIG. 6

| | H1 | H2 | H3 | P /W |
|---|---|---|---|---|
| [H1] CHAPTER HEADING [/H1] | 1 | 0 | 0 | 0 |
| [CPR] (C) ABC CO 1990 [/CPR] | 1 | 0 | 0 | 1 |
| [P] PARAGRAPH OF TEXT [/P] | 1 | 0 | 0 | 2 |
| [H2] FIRST TOPIC HEADING [/H2] | 1 | 1 | 0 | 0 |
| [LOCC] SOUND STRING [/LOCC] | 1 | 1 | 0 | 1 |
| [P] PARAGRAPH OF TEXT [/P] | 1 | 1 | 0 | 2 |
| [H2] SECOND TOPIC HEADING [/H2] | 1 | 2 | 0 | 0 |
| [P] PARAGRAPH TEXT [/P] | 1 | 2 | 0 | 1 |
| [H3] FIRST SUBTOPIC HEADING [/H3] | 1 | 2 | 1 | 0 |
| [LOCA] DISPLAY STRING [/LOCA] | 1 | 2 | 1 | 1 |
| [P] PARAGRAPH OF TEXT [/P] | 1 | 2 | 1 | 2 |
| [H2] THIRD TOPIC HEADING [/H2] | 1 | 3 | 0 | 0 |
| [P] PARAGRAPH OF TEXT [/P] | 1 | 3 | 0 | 1 |
| [SEC2] DO NOT COPY [/SEC2] | 1 | 3 | 0 | 2 |

STRUCTURED DOCUMENT TAGS INVOKING SPECIALIZED FUNCTIONS

BACKGROUND OF THE INVENTION

1. Technical Field

The invention disclosed broadly relates to data processing and more particularly relates to the management of display and printing operations for a document by a data processor, so as to comply with proprietary and security restrictions of the document.

2. Background Art

Modern word processing and text editing programs employ structured document architecture to provide greater control and flexibility in the displayed and printed appearance of documents prepared with the programs. Structured document architecture is described, for example, in the copending U.S. patent application Ser. No. 344,332, filed Apr. 26, 1989, entitled "A Method for Manipulating Elements Within a Structured Document Using Active Intent Interpretation," by C. J. Bennett, et al., assigned to the IBM Corporation and incorporated herein by reference. A structured document can be prepared in accordance with the standardized general markup language, such as is described in the International Standard's Organization Standard 8879-1986. A data stream of text marked up in accordance with the standardized general markup language, will have its text divided into elements consisting of a begin tag and its content and terminated by an end tag, when necessary. Within a WYSIWYG (what you see is what you get) editor, text is displayed to the user as it will appear when it is printed, even though its structure is defined by the begin tags and end tags for each element of text. Formatting of the elements within a structured document is done when the document is displayed to the user. Those elements which fall into the category of commonly used elements include paragraphs, simple lists, ordered lists, bulleted lists, and list items.

Large documents marked up with structured document architecture tags, can be manipulated as an electronic book, by the method described in the copending U.S. patent application Ser. No. 317,248, filed Feb. 20, 1989, entitled "A Method for Displaying On-Line Information," by E. Cassorla, et al., assigned to the IBM Corporation and incorporated herein by reference. The Cassorla, et al. patent application describes a method for creating on-line information from the same marked up source material used to create printed information such as a word processor or a markup language source used with a text formatter. A book data stream is provided, in an intermediate format for storing on-line information, specifically designed to be used by a book display program. The data stream captures and preserves structural information about the books, by using the structured document tags. The method is suited to display on-line books in a useable manner on a variety of display devices. A book display program manipulates the book data stream and allows users to interact with the on-line information. The electronic book may be used like a hard copy book, except that it is displayed on a display screen. The method allows readers to treat on-line books as if they were hard copy books, and uses the book data stream as its input.

Electronic books are frequently communicated, stored, displayed and modified in their soft copy form, with hard copies only occasionally made. Authors of such electronic books or documents frequently desire to impose appropriate forms of security treatment for the electronic books so generated and they wish to have any rights of authorship in their works, respected. However, the prior art has not provided an adequate means to enforce the author's intentions for the treatment of his electronic books or documents. Although the author may place a copyright notice on his soft copy documents, there is no mechanism for increasing the prominence of that notice. Security labels such as "Company Confidential," "Do Not Copy," or "Do Not Distribute," which the author may place on the soft copy of the document, are not readily enforceable.

TERMINOLOGY

The following terminology is used in this description, in referring to structured document architecture concepts.

SGML

Standardized General Markup Language. A markup language consisting of tags used to prepare structured documents. Refer to International Standards Organization standard 8879-1986 for definition and details.

STRUCTURED DOCUMENT

A document prepared in accordance with an SGML-compliant type definition.

ELEMENT

SGML-defined entity consisting of a begin tag and its alphanumeric string content, and including an end tag, when necessary.

EMPTY ELEMENT

An element whose contents are null, containing neither text nor other elements.

CURRENT DOCUMENT POSITION

The document position which determines the current page for display.

COMMONLY USED ELEMENTS

Those elements which fall into the category of commonly used elements include Paragraphs, Simple Lists, Ordered Lists, Bulleted Lists and List Items.

TAG NAME

The name given to a set of elements which all abide by the same rules of formatting. Examples of a tag name include PARAGRAPH, SIMPLE LIST, and LIST ITEM.

FORMATTED TEXT STREAM

The formatted text stream is the sequence of alphanumeric characters which includes the structured document tags and associated text for the elements comprising the structured document.

OBJECTS OF THE INVENTION

It is therefore an object of the invention to provide an improved method for managing the soft copy text of a structured document in a data processing system, so as to comply with proprietary and security restrictions of the document.

It is another object of the invention to provide an improved method for managing the display of pages from a structured document, so as to comply with proprietary and security restrictions of the document.

It is still a further object of the invention to provide an improved method for managing the printing of pages of a structured document, so as to comply with proprietary and security restrictions of the document.

It is yet another object of the invention to provide an improved method for managing the writing of a structured document into a bulk storage medium, so as to comply with proprietary and security restrictions of the document.

It is yet a further object of the invention to provide an improved method for managing the telecommunication of soft copies of a structured document, so as to comply with proprietary and security restrictions of the document.

It is still a further object of the invention to provide an improved method for managing the generation of acoustic enunciations corresponding to indicia elements placed in a structured document.

Summary of the Invention

These and other objects, features and advantages of the invention are accomplished by the system and method for employing structured document tags to invoke specialized functions. The invention finds application in a data processing system which includes a processor for executing program instructions, a display device coupled to the processor for displaying a plurality of document elements in an ordered sequence in response to the program instructions, a memory in which is stored a structured document with its element tags, and a printer coupled to the processor for printing portions of the structured document stored in the memory. A method is disclosed for managing the display or printing of special indicia contained within the structured document. The special indicia are proprietary notices such as for copyright or security notices such as "Do Not Copy." The method will control the display or printing of the document so as to comply with the proprietary or security notices. The method includes the step of storing in the memory as a part of the structured document, a special indicium element containing a string representing the indicium, the element being identified by a special indicium tag. The method searches for the special indicium tag in the structured document, sets a flag in the memory when the special indicium tag is detected and loads the string representing the indicium into the memory. The method will display the special indicium on selected pages of the structured document when being displayed in WYSIWYG form by the display device. The special indicium can be printed on a cover page or selected pages of a hard copy of the document printed on a printer. Printing, copying and communications commands can be aborted in response to certain security indicia.

This feature can be employed to place a special copyright notice on the first page of the displayed document as it is displayed on the display device. The copyright notice element including the indicium string and its copyright tag preceding the string can be located anywhere in the structured document's formatted text stream. This is referred to as a global tag. If a printer is connected to the system and commanded to print the document, a cover page can be selectively printed, in accordance with the invention, which includes the copyright notice, before the rest of the structured document is printed by the printer.

The special indicium string can also be a security label such as a "Company Confidential" label, which is identified by a security tag preceding the string. In accordance with the invention, the security label can selectively be displayed on all pages which are displayed in WYSIWYG form on the display device for the structured document. Alternately, if a printer is connected to the system and it is commanded to print the document, then in accordance with the invention, a cover page can selectively be generated upon which is printed the security label. The security label can also selectively be placed on each printed page of the structured document, by the printer.

The special indicium string can be a "Do Not Copy" label. A "Do Not Copy" label can be a special indicium string in the structured document identified by a "Do Not Copy" tag preceding the string, which can then be selectively displayed on all pages when the document is displayed on the display device. Still further, in accordance with the invention, if a printer connected to the system is commanded to print the document, the printing operation will be aborted in response to the presence of the "Do Not Copy" indicium. Still further and in accordance with the invention, if a disk drive storage device is connected to the system, a write to disk command for the document will be aborted in response to the "Do Not Copy" indicium. Still further, if a communications adapter is connected to the system, a transmission command for the document will have its function aborted in response to the "Do Not Copy" indicium.

An additional feature which is provided by the special indicium is the provision of a password. A password string can be embedded within the structured document text and identified by a special password tag preceding the string. When the initial search through the structured document identifies a password tag, before any further display or printing of the structured document is allowed, the method will present the user with a message that the user must enter a password. The password entered by the user, for example, must be identical to the embedded password string within the structured document text. Only if the user inputs the correct password, will further document display and printing functions be allowed, in accordance with the invention.

Another feature provided by the invention is the provision of local display or sound playing indicia elements. These are designated by local tags for the display of the special indicia only on the page of the document where the tag is located. If a local display indicium tag is provided, then when a particular page from the structured document bearing the local indicium tag is displayed on the display device, the associated special display indicium string will provide for the highlighting or other visual feature on that page. Alternately, if a "play sound" indicium tag is provided, then the string within the sound element will be transmitted to a sound generating device connected in the system when the page of the structured document bearing the local sound indicium element, is displayed on the display device.

BRIEF DESCRIPTION OF THE DRAWINGS

These and other objects, features and advantages of the invention will be more fully appreciated with reference to the accompanying figures.

FIG. 2 is a first example of element tags and associated text.

FIG. 4 is a diagram of the default parameter table.

FIG. 5 is a diagram of the default parameter table after the initialization process of FIG. 7.

FIG. 6 is a more detailed diagram of the memory image for a second example of the formatted text stream 25, showing in particular the element coordinates 156 associated with each particular element in the formatted text stream.

DESCRIPTION OF THE BEST MODE FOR CARRYING OUT THE INVENTION

Figure 1:
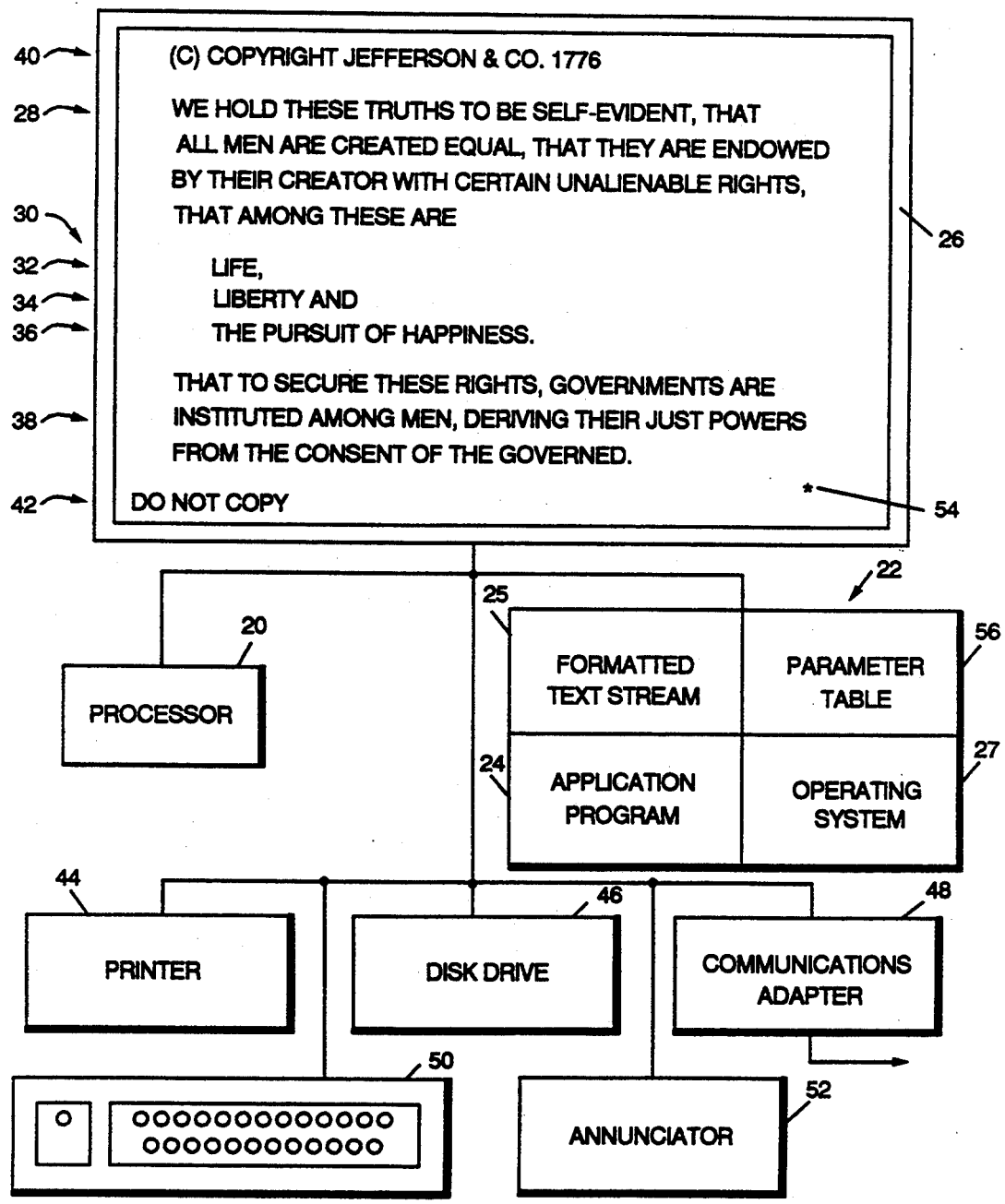
FIG. 1 is a system block diagram of the document manager system, in accordance with the invention.

The document manager system shown in FIG. 1 includes a processor 20 connected to a display device 26, to a memory 22, to a printer 44, a disk drive 46, a communications adapter 48, a keyboard 50 and an enunciator 52. The processor 20 executes program instructions 24 stored in the memory 22, which are represented by the flow diagrams of FIGS. 7-11. The display device 26 coupled to the processor 20 displays in WYSIWYG form, a plurality of document elements such as paragraphs 28 and 38, the list 30, which includes the list items 32, 34 and 36 shown in the display 26 of FIG. 1. Cursor 54 is also shown. The elements can include lists which are either ordered or unordered, and elements can also include graphics as well as text. Of special note is the copyright notice 40 and the "Do Not Copy" security label 42 displayed in WYSIWYG form for the page of the structured document shown in the display 26 of FIG. 1. The document elements 28-42 are organized in a formatted text stream having an ordered sequence, as can be seen in FIG. 2, using structured document notation, where the ordered sequence is specified by a corresponding ordered sequence of the plurality of element tags. The paragraph 28 in FIG. 2 is shown in the structured document notation with the begin tag [p] and the end tag [/p]. Each element such as the paragraph 28 shown in FIG. 2, is a structured document element having a begin tag [p], the text of the paragraph in this example, and then an end tag [/p]. The begin tag and the end tag serve to identify the element type, in this case indicating a paragraph. The order of occurrence of the WYSIWYG display of paragraph 28 on the display 26 is determined by the order of occurrence in the formatted text stream of the structured document element representing that paragraph 28 shown in FIG. 2, within the context of the order of occurrence of the other structured document elements, as for example, the list 30 and the paragraph 38.

In accordance with the invention, special strings such as a copyright notice or such as a security label, are embedded within special indicia elements having special structured document tags in the structured document. Specifically, the copyright notice element 40 is a string embedded between a begin tag [cpr] and an end tag [/cpr]. Similarly, the security label string "Do Not Copy" is embedded in the structured document text within a begin tag [sec2] and an end tag [/sec2]. When the processor 20 detects the presence of a special indicium tag such as a copyright begin tag or such as a security label begin tag, it makes special note of their presence within the memory 22, so that when specified display 26, printer 44, disk drive storage 46, communications adapter 48 or enunciator 52 functions are requested, corresponding actions are taken in accordance with the type of special indicium. For example, if a "Do Not Copy" security element is identified in the document text, then the printer function will be inhibited if the user requests the printing of the structured document within which the "Do Not Copy" label is identified.

Figure 3:
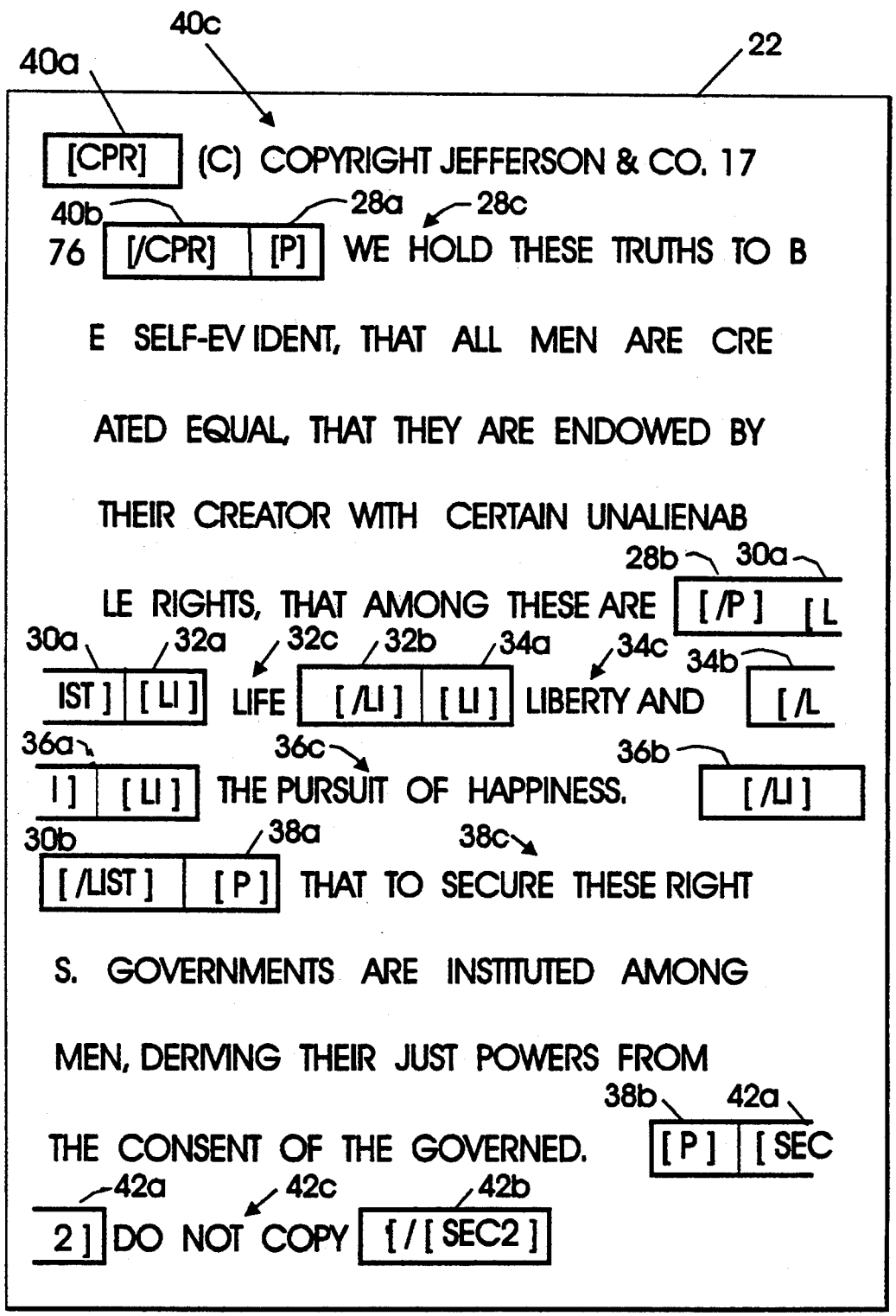
FIG. 3 illustrates the memory organization of element tags and associated text, for the example of FIG. 2.

The order of occurrence of the structured document elements such as the paragraph 28, list 30 and paragraph 38, can be determined by their order of occurrence in the formatted text stream stored in the memory 22 as is shown in FIG. 3. FIG. 3 shows that the structured document text with its tags of FIG. 2, have been stored in the memory 22 in a linear sequential order, which is the formatted text stream 25. Paragraph element 28 includes tags 28a and 28b and text 28c. List element 30 includes tags 30a and 30b. List item element 32 includes tags 32a and 32b and text 32c. List item element 34 includes tags 34a and 34b and text 34c. List item element 36 includes tags 36a and 36b and text 36c. Paragraph element 38 includes tags 38a and 38b and text 38c.

The special copyright notice element is represented by the begin tag 40a and the end tag 40b which surrounds the copyright notice string 40c. Similarly, the special security label "Do Not Copy" element is represented by the begin tag 42a, and the end tag 42b, which surrounds the "Do Not Copy" string 42c. In accordance with the invention, when the processor 20 searches through the formatted text stream 25 stored in the memory 22 and detects the presence of the begin tag 40a or the end tag 40b for the copyright string 40c, the processor loads the copyright string 40c into a specified partition 60 of the parameter table 56 in the memory 22 and it sets a flag 62 to indicate the presence of a copyright string, as shown in FIGS. 4 and 5. Correspondingly, if the processor 20 detects the presence of the begin tag 42a for the "Do Not Copy" string 42c, the processor will load the string 42c in the memory in a specified partition 60 and will set a flag 62 indicating that this type of security label is present in the structured document.

Still further in accordance with the invention, at the time of initial program loading for the application program 24 into the data processing system shown in FIG. 1, a default parameter table 56 is loaded into memory at a pre-specified partition. The default parameter table 56 shown in FIG. 4 will have a set of default values entered therein which are stored in the memory 22. Alternately, the user can enter a profile of values for the parameter table 56. The parameter table 56, as loaded at the initial program loading, will include the characters representing each special tag such as the copyright tag "cpr," a "Do Not Copy" tag "sec2," and the like, as is shown in FIGS. 4 and 5. Also included in the parameter table 56 of FIG. 4 will be values indicating the response which the data processing system is to make when particular tagged strings are identified in the document text loaded into the memory 22. For example, if a copyright tag "cpr" is detected in a structured document, then the default parameter table 56 will indicate that if the document is to be displayed on the display 26, the first page displayed will include the copyright notice. If the document is to be printed by the printer 44, then a cover page will be generated with the copyright notice, prior to the printing of the structured document.

FIG. 6 is a more detailed diagram of the memory image for a second example of the formatted text stream 25, showing in particular the paragraph coordinates 156 associated with each particular paragraph, heading and other element in the formatted text stream 25. The formatted text stream 25 illustrated in FIG. 6 has structured document tags similar to those referenced above. The structured document tags for the chapter heading is the begin tag [h1] and the end tag [/h1]. Under the chapter heading, there are two elements, the first being a copyright notice 140 represented by the special tag [cpr] followed by the special copyright notice string "(C) ABC Co 1990" and followed by the end tag [/cpr]. The second element under the chapter heading is a paragraph element denoted by a paragraph begin tag [p] and an end tag [/p]. The formatted text stream 25 is characterized by a hierarchical organization, in that the first topic heading depicted by its begin tag [h2] and end tag [/h2], is subsidiary to the chapter heading in the hierarchy. Use is made of this hierarchical structure for the formatted text stream 25, to establish a coordinate system 156. The coordinate system 156 is shown in FIG. 6 as it can be stored in memory 22, with four digits representing the hierarchical level of the particular heading or element entry to which the coordinate is associated. For example, the paragraph 142 has a coordinate of h1=1, h2=1, h3=0 and p=2. This means that the element 142 is part of the first h1 chapter heading, part of the first h2 topic heading, and is not part of any subsidiary topic heading to the first topic heading. The p=2 coordinate represents that element 142 is the second element under the first topic heading.

It is to be noted that there are two local tags in the formatted text stream 25 of FIG. 6, the first being at the element 150 which contains the begin tag [locC] followed by the "Sound String," which is followed by the end tag [/locC]. The coordinates for the element 150 are 1101. The sound string element 150 will be given effect by playing the desired sound on the enunciator 52, as specified by the sound string, when the page containing the element is to be displayed on the display 26.

FIG. 6 shows a second local element 160 which includes the begin tag [locA] followed by the "Display String," which is followed by the end tag [/locA]. Element 160 has the coordinates 1211. The local element 160 will be given effect on display 26 when the page containing the local element 160 is displayed by the display 26.

The formatted text stream 25 of FIG. 6 further includes a global element 170 which is a security element containing the begin tag [sec2] followed by the string "Do Not Copy," which is followed by the end tag [/sec2]. The copyright notice element 140 and the "Do Not Copy" notice element 170 are global elements which will be given effect, without regard for the location at which the element occurs in the formatted text stream 25.

Figures 7, 7A:
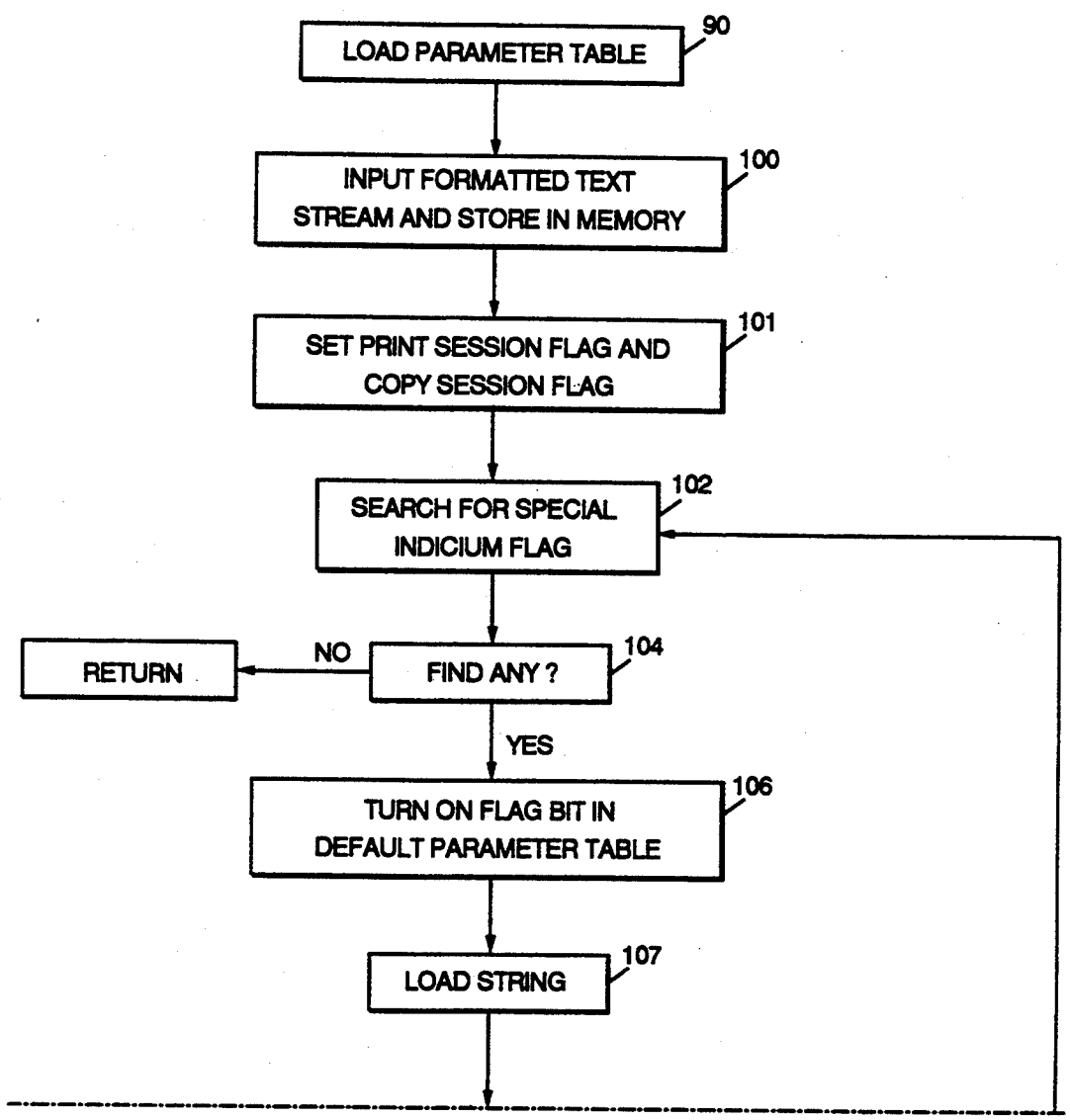
FIG. 7, consisting of FIGS. 7A and 7B, is a flow diagram of the initialization process.
Figure 7B:
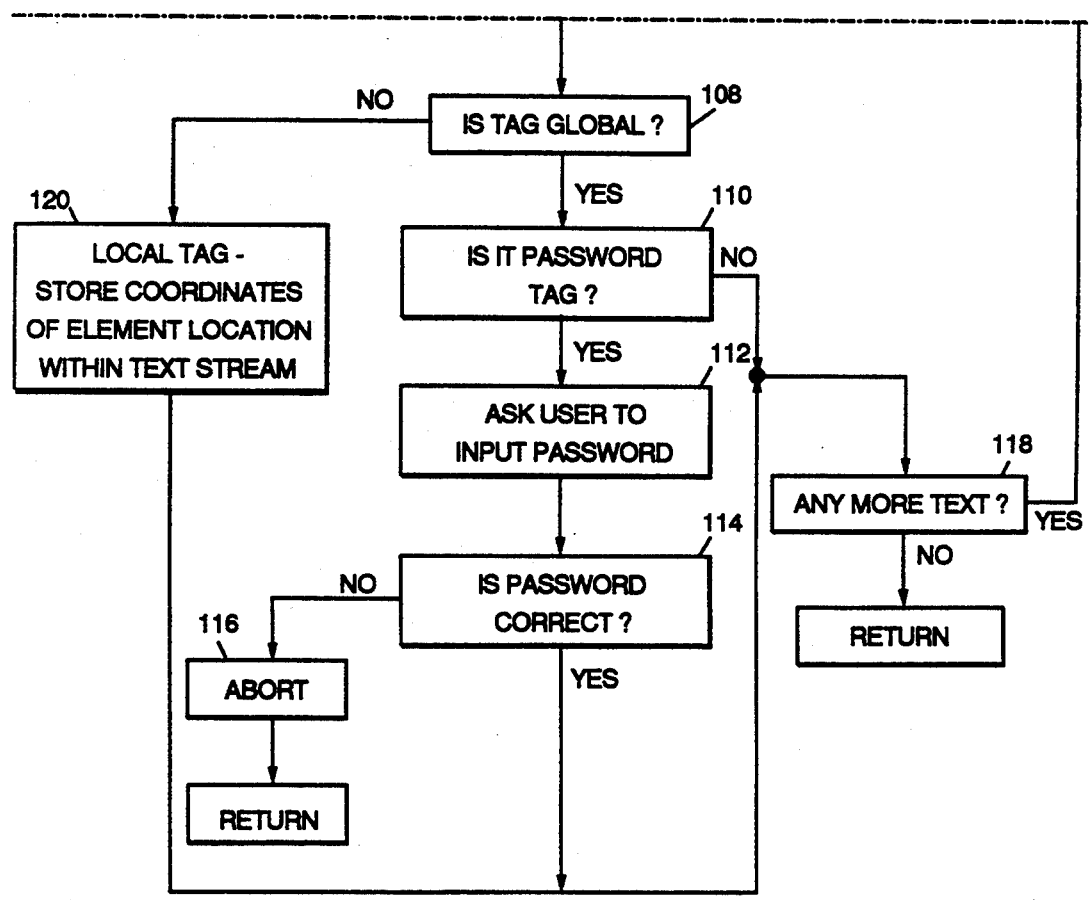
Figure 8A:
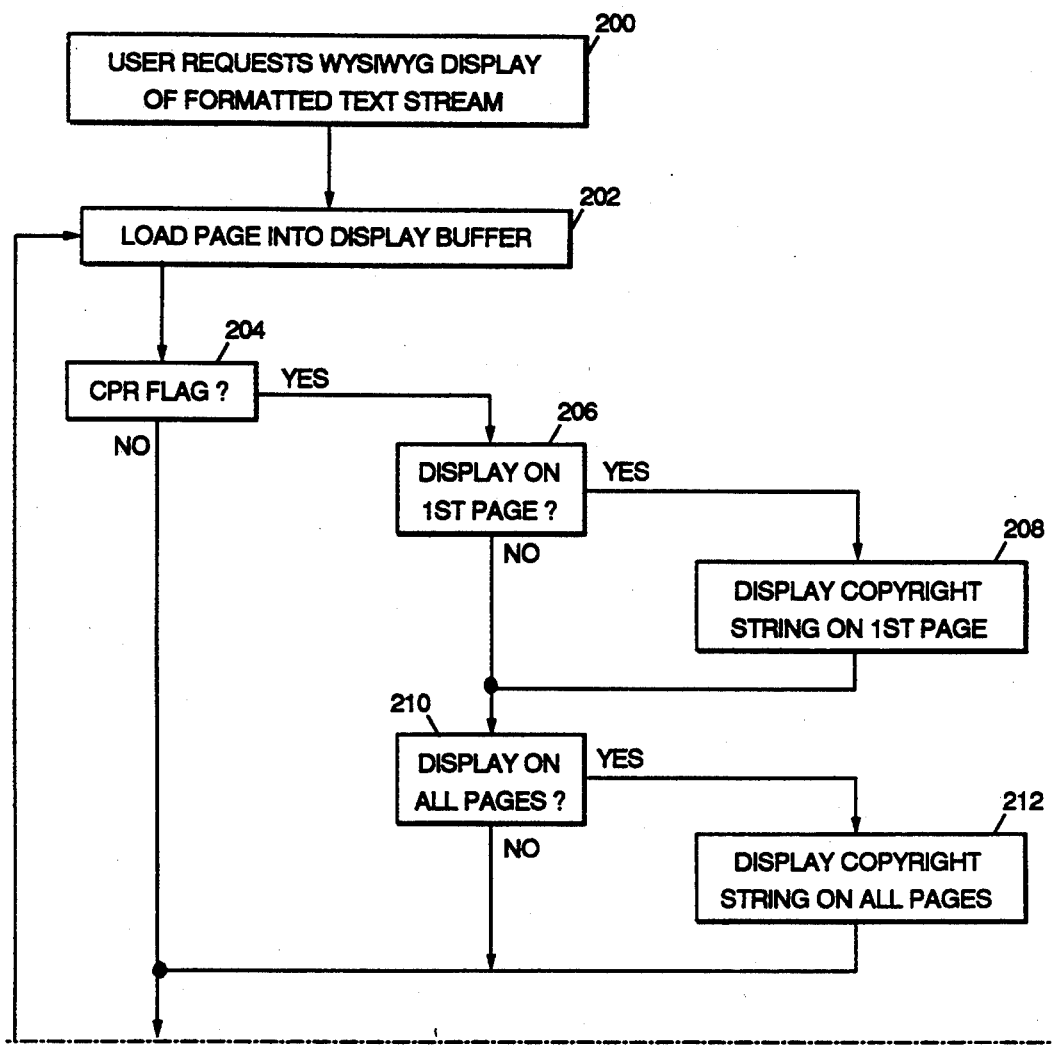
FIG. 8, consisting of FIGS. 8A, 8B, 8C and 8D, is a flow diagram for displaying a document.
Figure 8B:
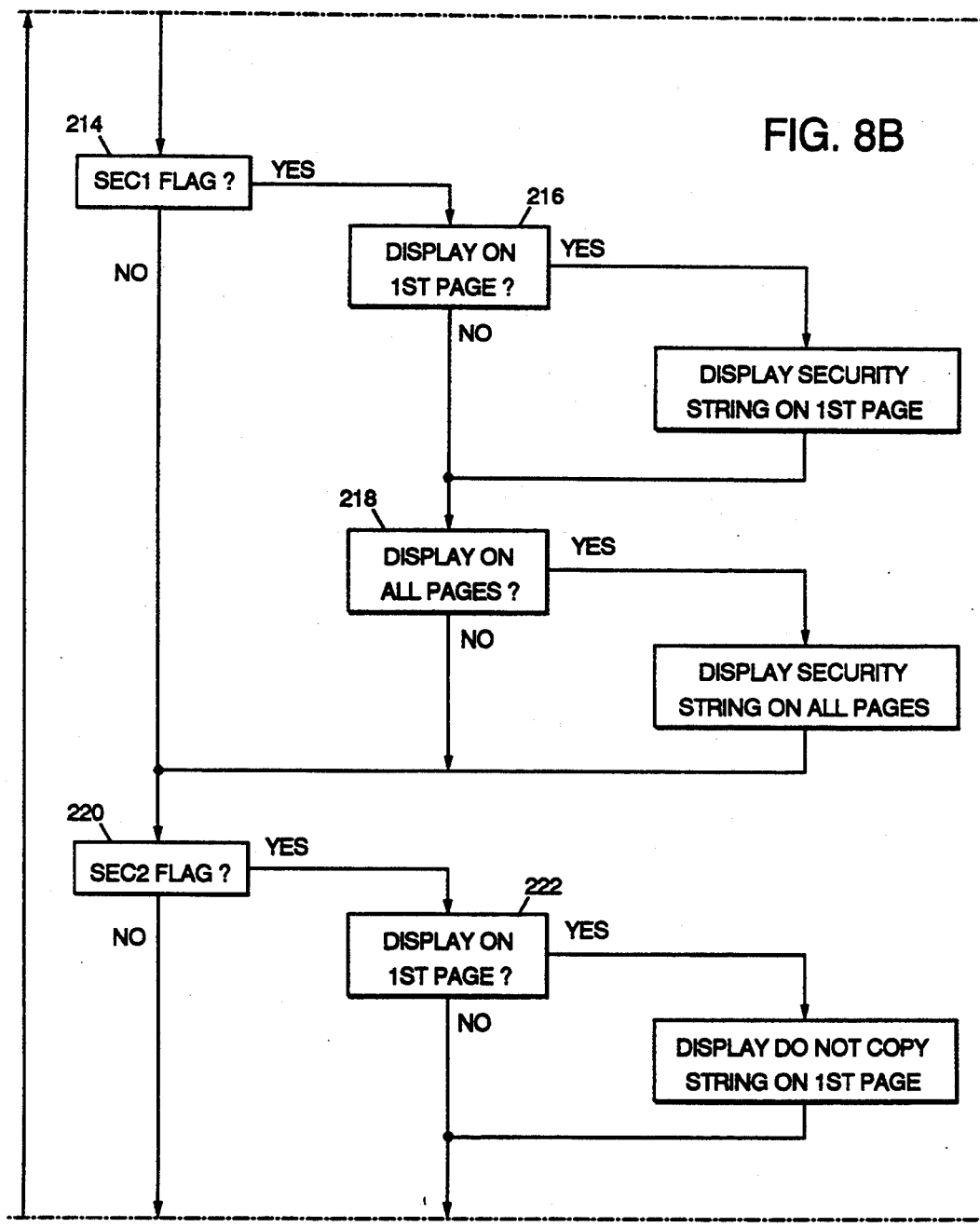
Figure 8C:
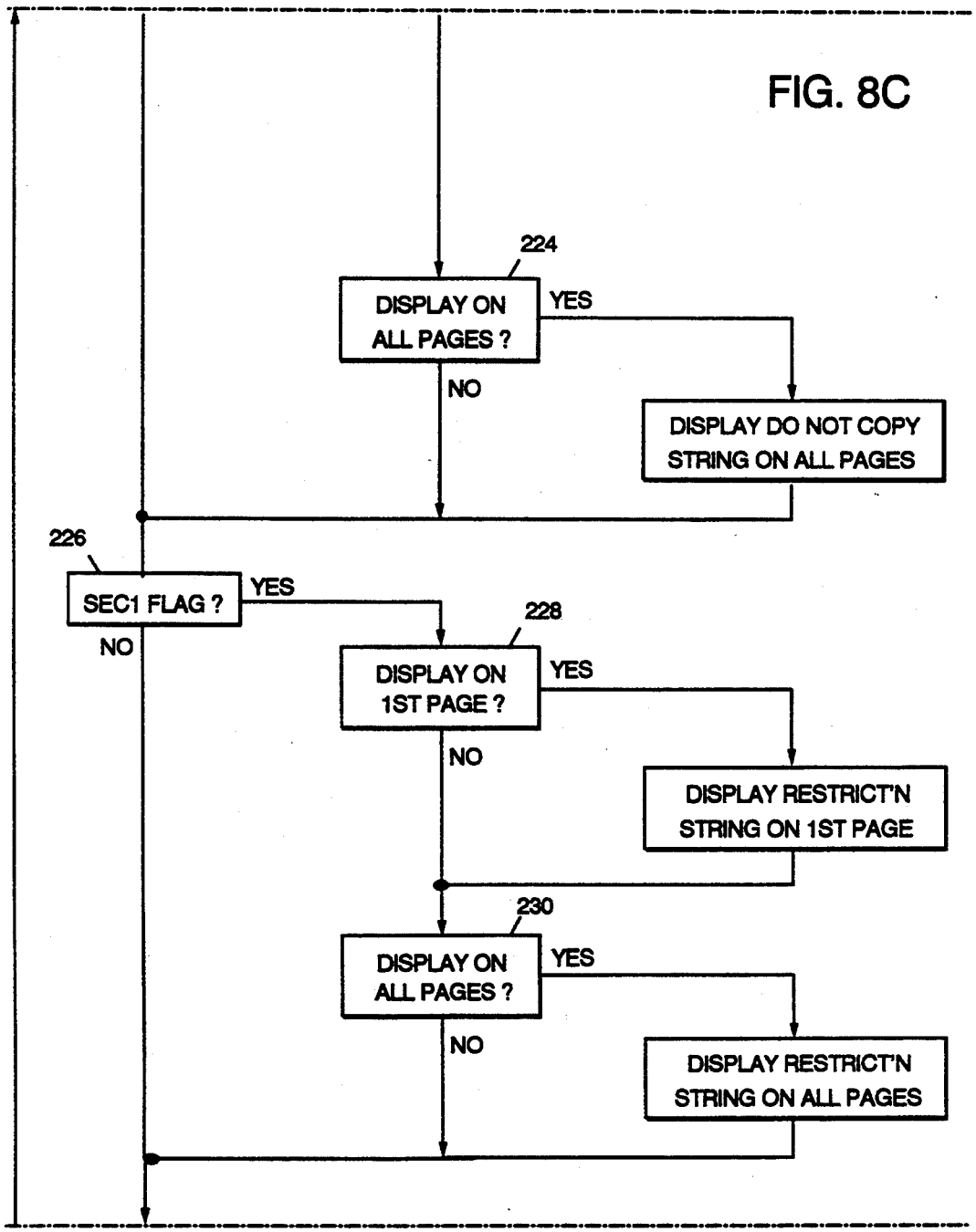
Figure 8D:
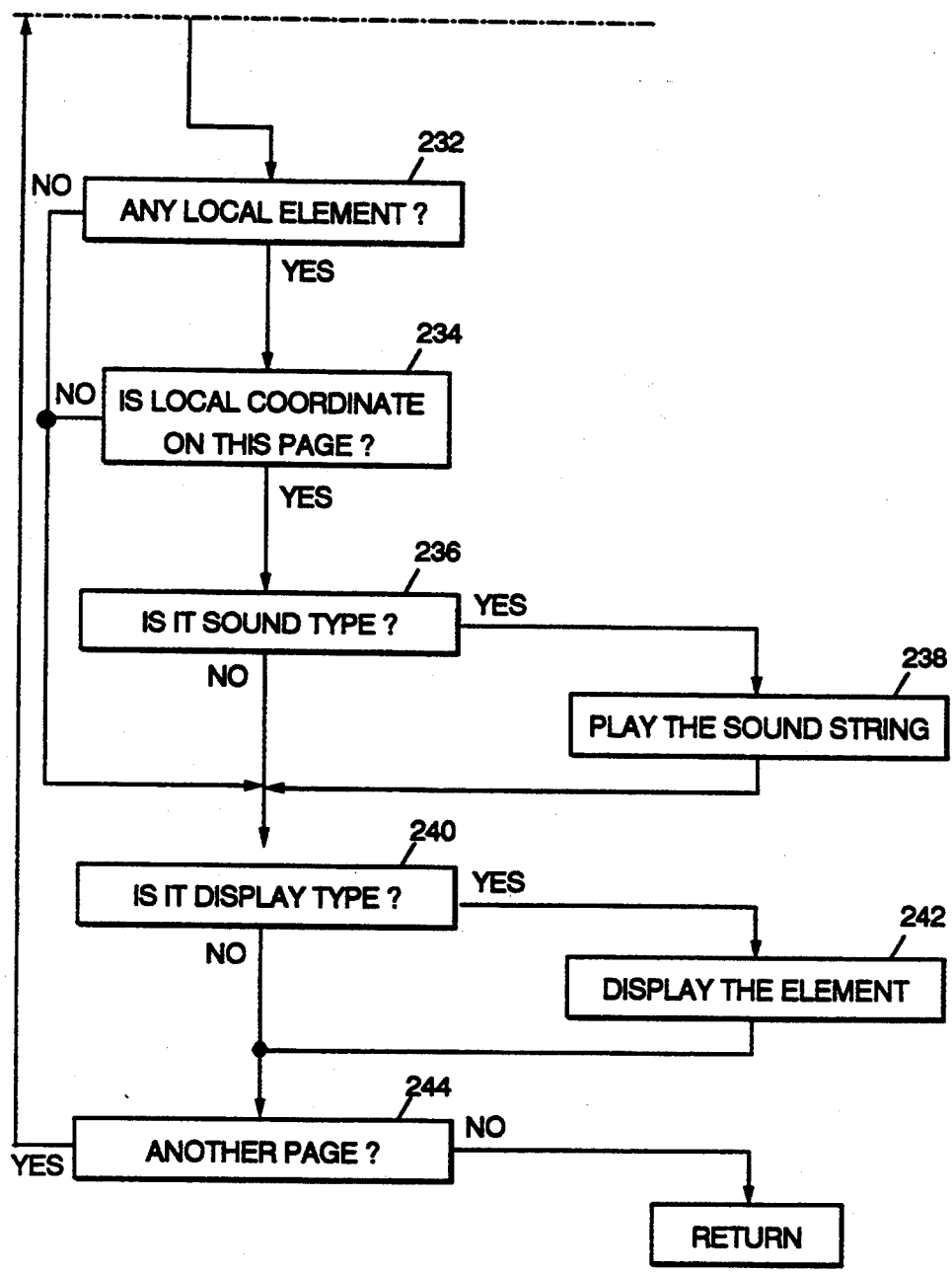

FIG. 7 is a flow diagram of the initialization of the system of FIG. 1, loading the parameter table 56 into the memory 22 and setting the values of the parameters therein, in accordance with the occurrence of particular special elements which may occur in the formatted text stream 25. The flow diagram of FIG. 7 starts with step 90 which loads the parameter table of FIG. 4, containing the default names of the tags and the default functions to be performed by the display 26, printer 44, disk drive 46, communications adapter 48, and enunciator 52 in response to the occurrence of any of the special tags occurring in the formatted text stream 25. It is the objective of the flow diagram of FIG. 7 to scan through the formatted text stream 25 and identify special tags for special elements and to load the corresponding strings into the default parameter table 56 and turn on the corresponding flags in the default parameter table 56 so that there results a table 56 such as is shown in FIG. 5.

Step 90 loads the parameter table 56 of FIG. 4 into the memory 22 and step 100 inputs the formatted text stream 25 of the structured document and stores it in memory 22. Step 100 then flows into step 101 where a print session flag is set and a copy session flag is set. As will be described later, the first time that the user wishes to print any portion of the formatted text stream which was input in step 100, special notices can be displayed as set forth for steps 305 and 307 in FIG. 9, after which step 309 will turn off the print session flag so that subsequent commands to print portions of the same document will not result in the repeated display of warning messages and notices. The copy session flag will have a similar effect the first time that the user commands that the formatted text stream be communicated in FIG. 10 or written to a disk as provided in FIG. 11. In FIG. 7, step 101 then flows to step 102. Then step 102 searches for any special indicium tag as specified by the default expressions for the tags in column 64 of the default parameter table 56 of FIG. 4. In step 104, if any special tag is found, then in step 106 the corresponding flag in column 62 of table 56 is turned on. Then in step 107, the string enveloped by the special begin tag and its corresponding end tag is loaded into column 60 of table 56. For example, in the formatted text stream 25 of FIG. 6, the search step 102 will identify element 140 which is a copyright notice string, by the [cpr] special tag. The corresponding flag in column 62 will be turned on and the string "(C) ABC Co 1990" will be stored in the column 60 of the default parameter table 56, as is shown in FIG. 5.

Then, the flow diagram of FIG. 7 will have step 108 determine whether the tag is a global tag. The tags "locA," "locB," and "locC" are all local tags, the rest of the tags represented in column 64 of table 56 being global tags. Since the [cpr] tag is a global tag, a determination is made in step 110 as to whether the tag is a password tag, that is whether it is [pswd]. If it is a password tag, then the process flows to step 112 which asks the user to input the password, the true password being stored in a string within the formatted text stream 25, associated with the password tag. If the user inputs the correct password, as determined in step 114, then the process flows to step 118. However, if the user fails to input the correct password, the process flows to step 116 which aborts any further operations and the process returns to the main program. A notice can be displayed to the user that the password was not correct. Alternately, if the tag is not a password tag as determined in step 110, then a process flows to step 118.

If step 108 determines that the tag is a local tag, as determined by column 64 of the default parameter table 56, then the coordinate for the local tag element is stored in column 66 of the table 56 in step 120. Thereafter, the process flows to step 118.

In step 118, it is determined if there is any more text to be scanned in the formatted text stream and if there is, then the process flows back to step 102 to search for any additional special indicium tags. Alternately, if there is no more text to be scanned, then the flow returns to the main program. At the end of the operation set forth in the flow diagram of FIG. 7, the default parameter table 56 will be populated as is shown in FIG. 5, with those special elements which have been detected in the formatted text stream 25, having their corresponding text strings loaded into column 60 of table 56, the corresponding flag turned on in column 62 and, for local tags, the corresponding local coordinates loaded in column 66. FIG. 5 shows that there are two global special elements, element 140 which is a copyright notice element and element 170 which is a "Do Not Copy" notice element, and that there are also two local special elements, a sound element 150 and a display string element 160.

FIG. 8 is a flow diagram of the sequence of operational steps for displaying the formatted text stream 25 on the display 26. In step 200, the user requests a WYSIWYG display of the formatted text stream 25. In step 202, a page of the formatted text stream is loaded into a display buffer. In step 204, the default parameter table 56 is interrogated to determine if there is a global copyright flag turned on in column 62. If yes, then step 206 determines from table 56 whether the copyright notice is to be displayed on the first displayed page on the display 26. If yes, then step 208 displays the copyright notice on the first displayed page. The process then flows to step 210 which determines whether table 56 specifies that the copyright notice is to be displayed on all pages displayed on the display 26. If yes, then each page of the formatted text stream 25 which is displayed would include a copyright notice at the appropriate location on the display screen of display 26. However, in the example of FIG. 5, there is no requirement for the display of the copyright notice on each page. The process then flows to step 214 which determines whether a security label with a [sec1] tag has its flag turned on in column 62 of the default parameter table 56. If it does, then the process flows to steps 216 and 218 which are similar to steps 206 and 210, respectively. The process then flows to step 220 which determines whether there is a "Do Not Copy" label corresponding to a [sec2] tag with its flag on in column 62 of the default parameter table 56. If there is, then the process flows to steps 222 and 224 which are similar to steps 206 and 210. In this example, there is a "Do Not Copy" label since the flag is on in column 62. The default parameter table 56 shows that the "Do Not Copy" label is to be applied to every page displayed on the display 26. Therefore, step 224 determines that the "Do Not Copy" label will be displayed on every page.

The process then flows to step 226 which determines whether there is a restriction element present and if so, then the process flows to steps 228 and 230, which are similar to steps 206 and 208. In this example, there is no restriction element corresponding to the tag [rest]. Restriction elements can be for example, a limited rights notice which the author wishes to place in his documentation. Typically the limited rights notice would be placed on the first page to be displayed to the reader, along with copyright notice and any security notice such as a confidential information label.

The process then flows to step 232 which determines if there are any local tags present, by determining if there are any corresponding flag bits turned on in column 62 of table 56. In this example, there are two bits turned on in column 62. Therefore, the process of FIG. 8 flows to step 234 which determines if the local coordinates in column 66 of table 56 are on the current page being displayed on the display 26. If they are, then the process flows to step 236 to determine if the local special element is a sound-type element having a "[locC]" tag. If it is, then the process flows to step 238 where the sound string is transferred from column 60 in table 56 to the enunciator 52 associated with the processor 20 to play the sound specified by the sound string. This is the case for the example of FIG. 5, where if the page being displayed on the display 26 includes the element coordinates 1101, then the sound string is played at this time. The process then flows to step 240 which determines if there is a local special element of the display type, having a tag "[locA]," for the page currently displayed on the display 26. If yes, then step 242 either displays the corresponding string stored in column 60 of the default parameter table 56 or alternately, executes a display-type command, such as a reverse video highlight for the page being displayed. This is the case for the example of FIG. 5 where, if the element coordinate 1211 is present in the page being displayed on display 26, then a reverse video highlighting is provided for the page being displayed.

The process of FIG. 8 then flows to step 244 to determine whether there is another page of text in the formatted text string 25 to be displayed. If there is, then the process flows to step 202 to load the next page into the display buffer and the flow diagram of FIG. 8 continues. If not, then the process returns to the main program.

Figure 9A:
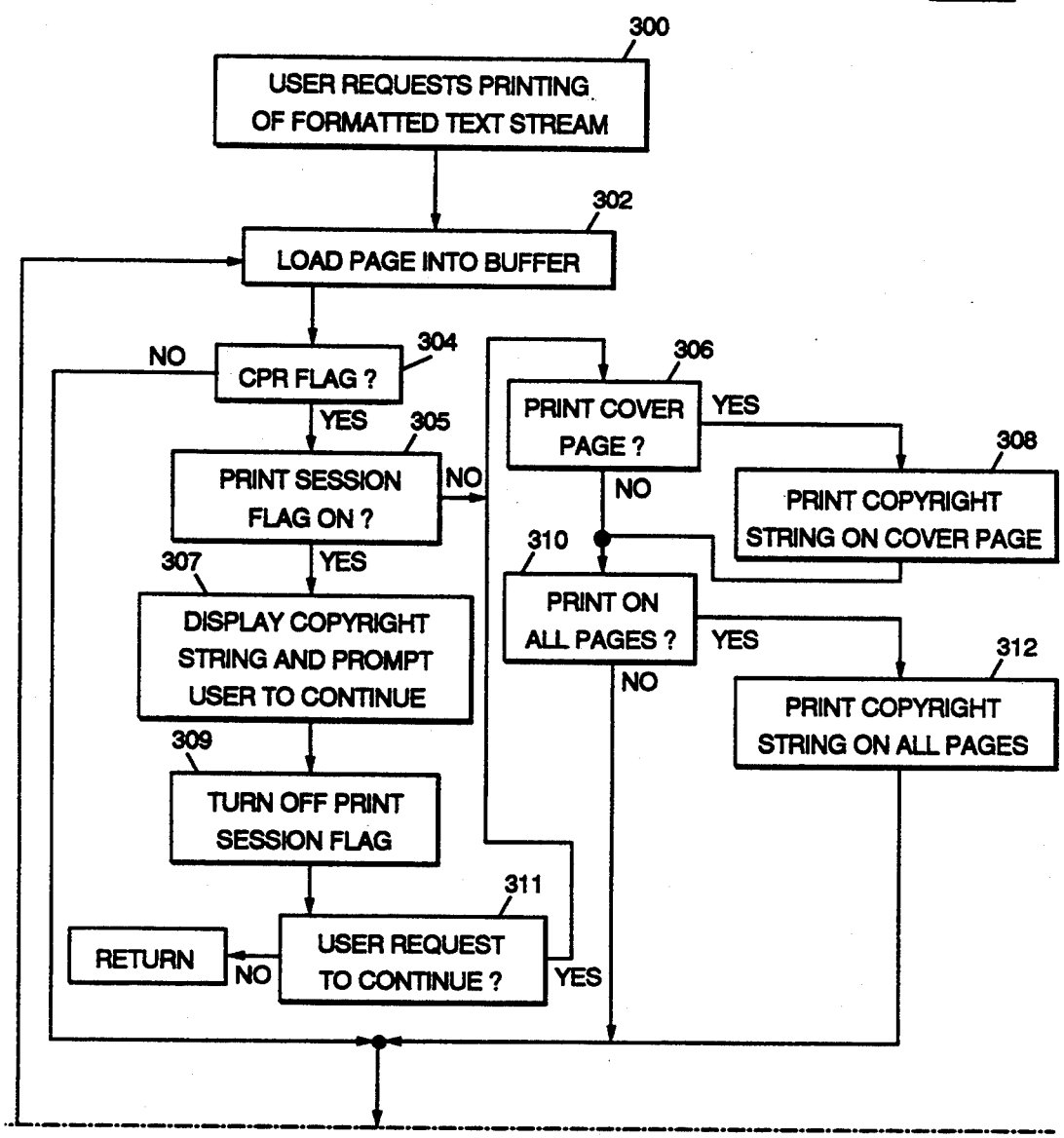
FIG. 9, consisting of FIGS. 9A, 9B, and 9C, is a flow diagram for printing a document.
Figure 9B:
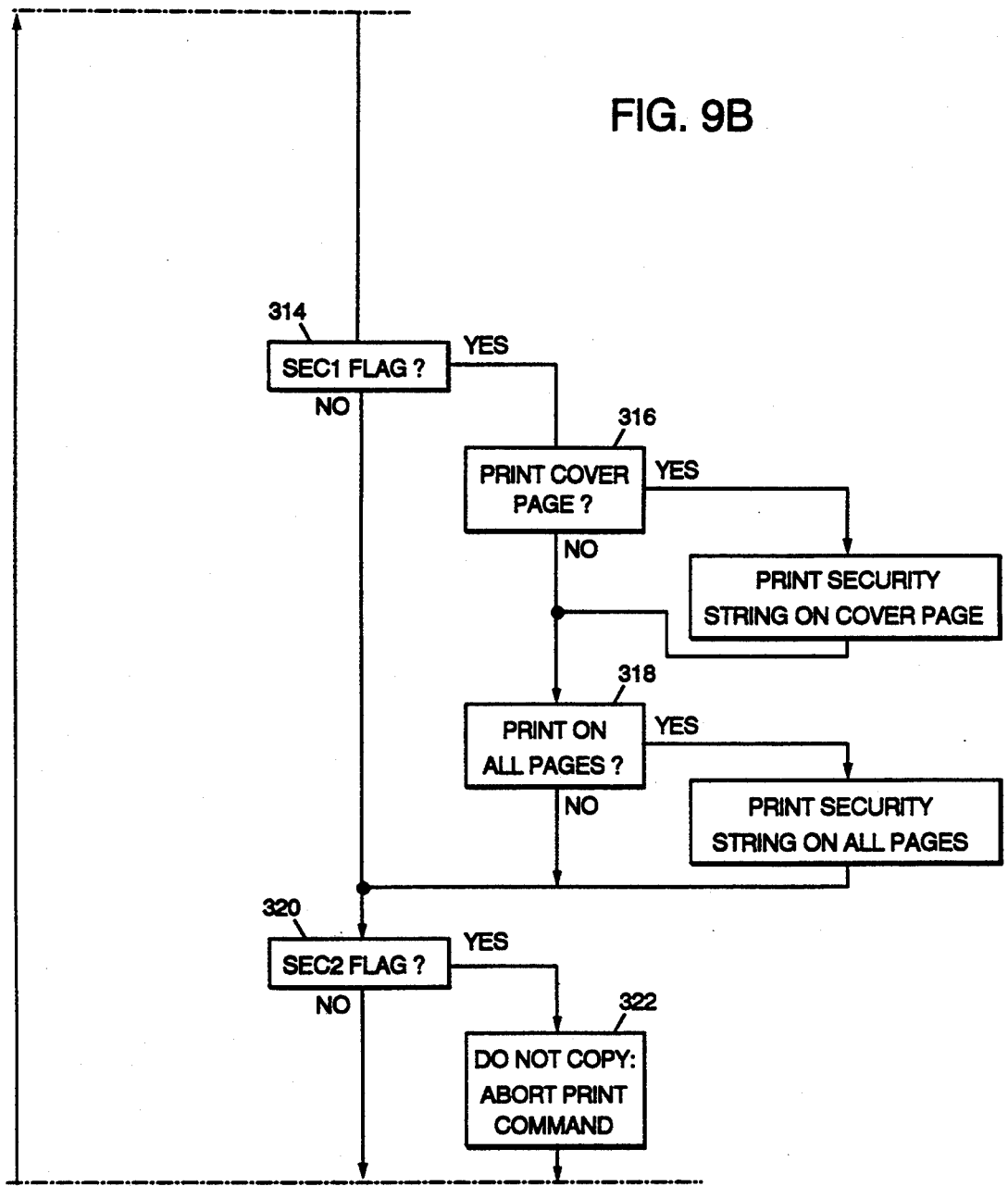
Figure 9C:
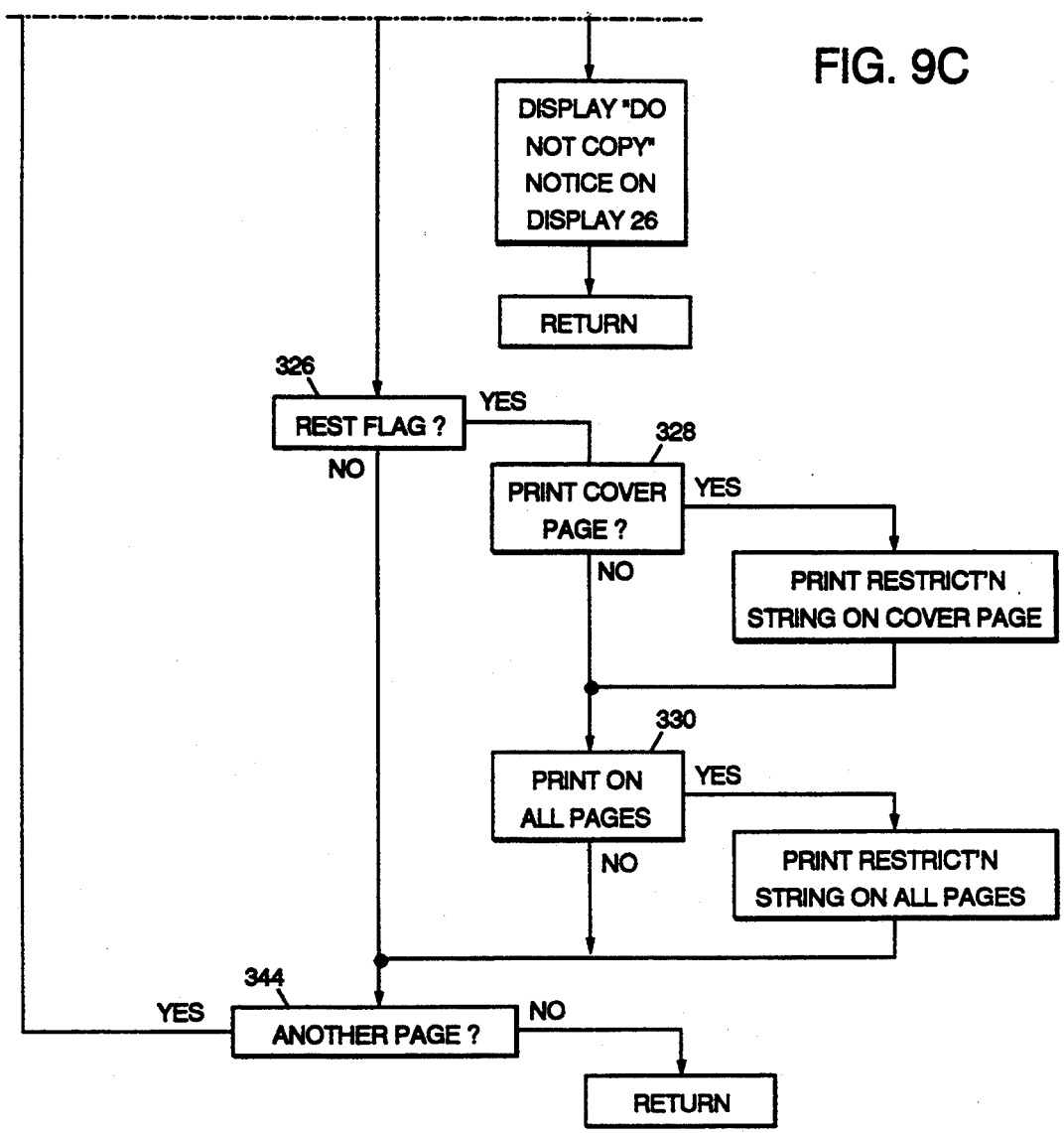

FIG. 9 is a flow diagram of the sequence of operational steps for printing the formatted text stream 25 with the printer 44. The process begins with step 300 wherein the user requests the printing of the formatted text stream. Then step 302 loads a page into a buffer for printing. Step 304 interrogates the default parameter table 56 to determine if there is a special copyright element with a flag bit on in column 62. The process then flows to step 305 which determines if the print session flag is on. If it is on, then the process flows to step 307 where a notice is displayed on the display 26 with the copyright string. A prompt symbol is presented to the user requesting whether the user wishes to continue. The user must affirmatively indicate his desire to continue by depressing a key on the keyboard 50, for example. Step 309 turns off the print session flag. In this manner the notice of 307 is displayed only the first time a command is made in step 300. Then in step 311, it is determined whether the user has indicated his desire to continue. If yes, then the process flows to step 306. If step 311 determines that the user indicates he does not wish to continue, then the process returns to the main program. This provision of a user option to continue, could also be employed for the SEC1 flag following step 314 and the restricted materials "rest" flag following step 326. Step 306 determines whether a cover page is to be printed prior to the printing of any other page of the document, displaying the copyright notice from the copyright string stored in column 60 of the default parameter table 56. In the case of the example shown in FIG. 5, a cover page is required and therefore step 308 prints a cover page containing the copyright notice "(C) ABC Co 1990." Then step 310 determines whether the copyright notice is to be printed on all pages. If it is, then step 312 will print the copyright notice string on all pages. The process then flows to step 314 where it is determined whether a security label is to be printed, by determining the presence of a corresponding flag bit in column 62 of table 56. If it is, then step 316 determines whether the security label is to be printed on a cover page preceding all other pages of the document. Then step 318 determines whether the security label is to be printed on every page of the document. In the case of the example in FIG. 5, there is no security label corresponding to the tag "[sec1]."

Step 320 then determines whether there is a "Do Not Copy" special element by determining whether there is a corresponding flag bit on in column 62 of table 56. In the case of the example of FIG. 5, there is a "Do Not Copy" label and therefore the process of FIG. 9 flows to step 322 which aborts the print command. At this time, a notice can be displayed on the display device 26 indicating that this is a "Do Not Copy" document, and printing has been terminated. The process will then return to the main program. Alternately, if step 320 determines that there is no "Do Not Copy" element, then the process flows to step 326 which determines whether there is a restriction element present by determining whether there is a corresponding flag bit turned on in column 62 of table 56. If there is, then the process flows to steps 328 and 330 which are similar to steps 306 and 310 above. The process then flows to step 344 to determine if there is another page to be printed. If there is, then the process flows back to step 302 to load the next page into the buffer for printing. If there is no next page, then the process returns to the main program.

Figure 10:
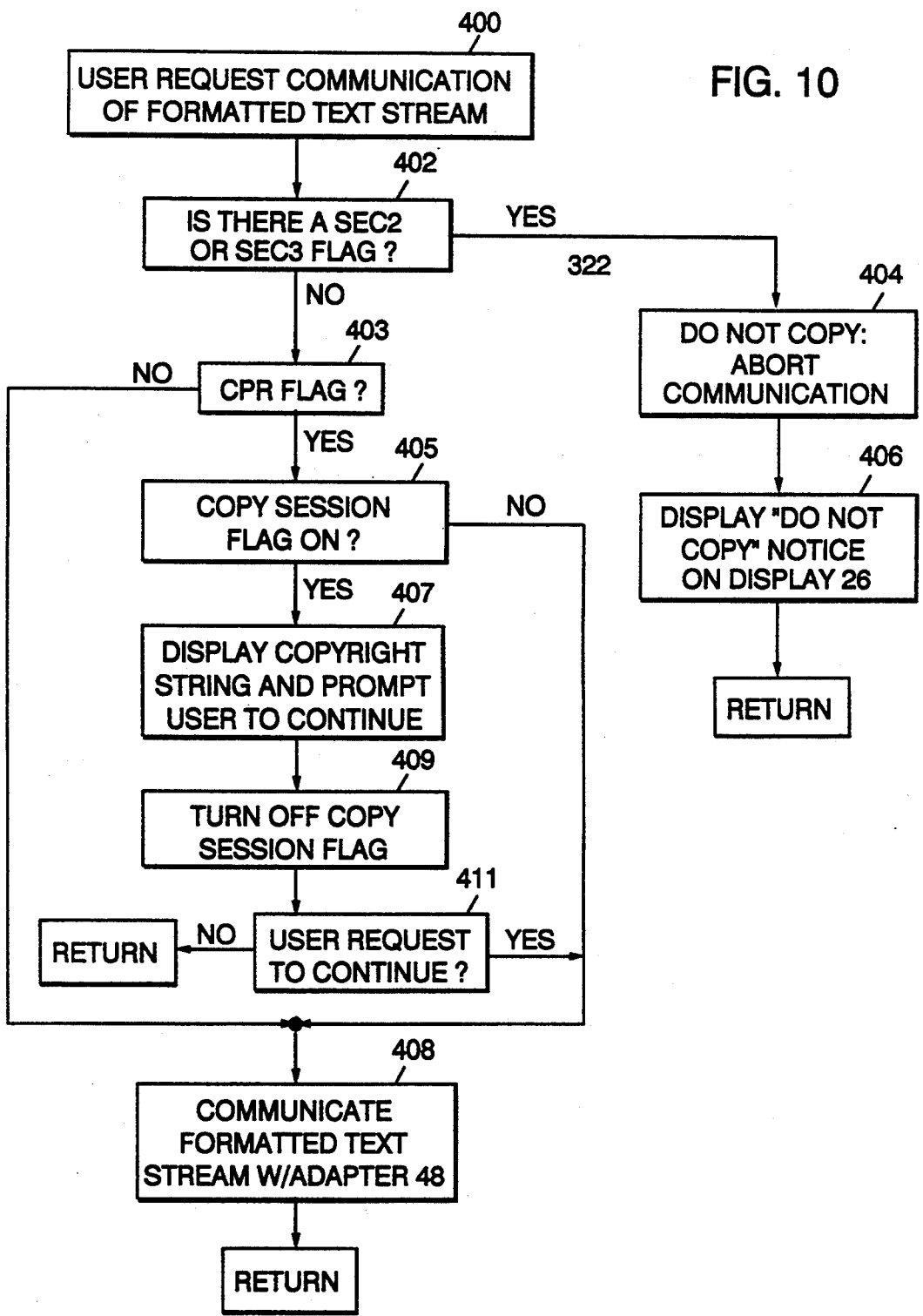
FIG. 10 is a flow diagram for communicating a document over a communications link.

FIG. 10 is a flow diagram of a sequence of operational steps to carry out the communication of the formatted text stream over a communications link using the communications adapter 48. The process begins with step 400 wherein the user requests the communication of the formatted text stream 25. Step 402 then determines whether there is a "Do Not Copy" security tag "[sec2]" or alternately a "Do Not Send" element with a tag "[sec3]" as would be determined by corresponding flag bits being on in column 62 of table 56. If there is, then the process flows to step 404 where the communications operation is aborted, and then it flows to step 406 where a notice is displayed on the display screen 26 that this is either a "Do Not Copy" or a "Do Not Send" document. The process then returns to the main program. Alternately, if step 402 determines that there is no "Do Not Copy" or "Do Not Send" label in the parameter table 56, then the process flows to step 403' where it is determined whether the copyright flag is present. If the copyright flag is present, the process flows to step 405 to determine if the copy session flag is on. If it is on, then the process flows to step 407' where the copyright string is displayed on the display 26 and a prompt is also displayed to the user requesting whether the user wishes to continue. If the user wishes to continue, the user must so indicate by pressing a key on the keyboard 50. Step 409 turns off the copy session flag. In this manner the notice to step 407 is displayed only the first time a command is made in step 400. Step 411' determines whether the user has indicated he wishes to continue. If the user wishes to continue, then the process flows to step 408. If the user indicates he does not wish to continue, then the process returns to the main program. Step 408 carries out the operation of sending the formatted text stream 25 over a communications link using the communications adapter 48. The process then returns to the main program.

Figure 11:
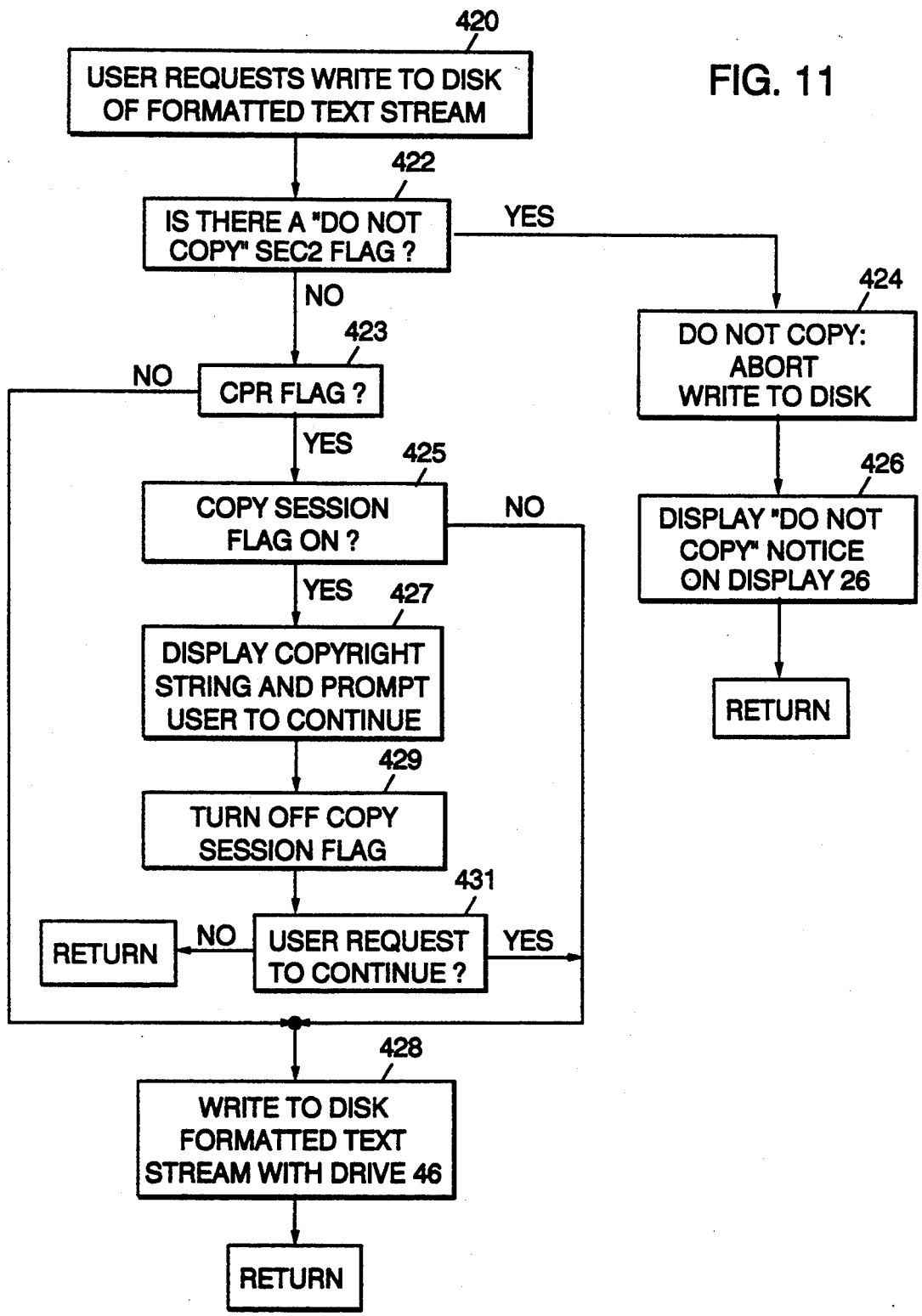
FIG. 11 is a flow diagram for writing the document onto a magnetic disk storage medium.

FIG. 11 illustrates a flow diagram of a sequence of operational steps to carry out the writing of the formatted text stream 25 onto a magnetic storage disk using the disk drive 46. The process begins with step 420 wherein the user requests the write to disk operation. Then in step 422 it is determined whether there is a "Do Not Copy" element in table 56, by determining if the corresponding flag bit in column 62 is turned on. In the case of the example in FIG. 5, there is a "Do Not Copy" element present, and therefore the process flows to step 424 where the write to disk operation is aborted and then it flows to step 426 wherein a notice is displayed on the display 26 that this is a "Do Not Copy" document. This is followed by a return to the main program. Alternately, if step 422 determines that there is no "Do Not Copy" element in the formatted text stream 25, then the process flows to step 304'' where it is determined whether the copyright flag is present. If the copyright flag is present, then the process flows to step 425 to determine if the copy session flag 425 is on. If it is on, the process flows to step 427 where the copyright string is displayed on the display 26 and the prompt is also displayed to the user requesting the user as to whether he wishes to continue. If the user wishes to continue, then the user must so indicate by pressing a key on the keyboard 50. Step 429 turns off the copy session flag. In step 431, it is determined whether the user has indicated he wishes to continue. If yes, then the process flows to step 428. Alternately, if the user indicates he does not wish to continue, then the process returns to the main program. In step 428 the write operation is carried out writing the formatted text stream 25 onto a magnetic disk using the disk drive 46. The process then returns to the main program.

It is seen that the invention as disclosed herein provides an improved method for managing soft copy text of a structured document. The invention provides an improved method for displaying pages from a structured document in accordance with security restrictions imposed by its author. The invention further provides an improved method for managing the printing of the pages of a soft copy document, while maintaining the security restrictions imposed by its author. The invention further provides a flexible means for managing the copying or telecommunication of a soft copy of a structured document, in accordance with the security restrictions imposed by its author. Still further, the invention provides a flexible means for customizing the visual highlighting and for providing acoustical enunciations for localized portions of a soft copy document being displayed on a display screen.

A number of alternatives can be selected for the functioning of the tags set forth herein. For example, the local tag "locA" which is a local display tag shown in the default parameter table of FIG. 4, can have the local effect within the text where it is embedded, of prohibiting the display of the text if the user has not presented an appropriate password "pswd." This would enable an author to enforce a confidential restricted treatment for those portions of his document where the "locA" tag is embedded.

Although a specific embodiment of the invention has been disclosed, it will be understood by those having skill in the art that changes can be made in that specific embodiment without departing from the spirit and the scope of the invention.

What is claimed is:

1. A computer method for managing the display of pages of a structured document on a display device in a system, so as to comply with restriction notices in the document, comprising the steps of:

inputting a control table into a computer system, specifying a first procedure for displaying a structured document in response to detecting a first type restriction notice in the document and specifying a second procedure for displaying a structured document in response to detecting a second type restriction notice in the document;

inputting into said computer system, a formatted text stream of a structured document which includes a restriction notice element having a special tag and a restriction notice character string;

searching said formatted text stream to identify said special tag and storing said restriction notice string in a memory in said system;

receiving a command to display said inputted document on a display device in said system;

determining whether said restriction notice in said inputted document is said first type or said second type;

accessing said table to determine whether said first or said second procedure is a determined procedure to be used to display said inputted document, in response to said determining step;

accessing said restriction notice string and displaying it on said display device associated with a display of said document, in accordance with said determined procedure.

2. A computer method for managing the printing of pages of a structured document on a printer device in a system, so as to comply with copy restrictions of the document, comprising the steps of:

inputting into a computer system, a formatted text stream of a structured document which includes a copy restriction notice element having a special tag and a restriction notice character string;

searching said formatted text stream to identify said special tag and storing said restriction notice string in a memory in said system;

receiving a command to print said document on a printer device in said system;

accessing said restriction notice string and displaying it on a display device in said system in response to said command to print;

aborting said command to print said document in response to identifying said special tag.

3. A computer method for managing the printing of pages of a structured document on a printer device in a system, so as to comply with restriction notices in the document, comprising the steps of:

inputting a control table into a computer system, specifying a first procedure for printing a structured document in response to detecting a first type restriction notice in the document and specifying a second procedure for printing a structured document in response to detecting a second type restriction notice in the document;

inputting into said computer system, a formatted text stream of a structured document which includes a restriction notice element having a special tag and a restriction notice character string;

searching said formatted text stream to identify said special tag and storing said restriction notice string in a memory in said system;

receiving a command to print said inputted document on a printer device in said system;

determining whether said restriction notice in said inputted document is said first type or said second type;

accessing said table to determine whether said first or said second procedure is a determined procedure to be used to print said inputted document, in response to said determining step;

accessing said restriction notice string and printing it on said printer device associated with a printing of said document, in accordance with said determined procedure.

4. A computer apparatus for managing the printing of pages of a structured document on a printer device in a system, so as to comply with copy restrictions of the document, comprising:

a memory in said system for receiving and storing a formatted text stream of a structured document which includes a copy restriction notice element having a special tag and a restriction notice character string;

a processor in said system coupled to said memory for searching said formatted text stream to identify said special tag and storing said restriction notice string in said memory in said system;

said system receiving a command to print said document on a printer device coupled to said processor in said system;

said processor accessing said restriction notice string and displaying it on a display device in said system coupled to said processor in response to said command to print;

said processor aborting said command to print said document in response to identifying said special tag.

* * * * *